US009230102B2

(12) United States Patent
Yu et al.

(10) Patent No.: US 9,230,102 B2
(45) Date of Patent: Jan. 5, 2016

(54) APPARATUS AND METHOD FOR DETECTING TRAFFIC FLOODING ATTACK AND CONDUCTING IN-DEPTH ANALYSIS USING DATA MINING

(71) Applicant: ELECTRONICS AND TELECOMMUNICATIONS RESEARCH INSTITUTE, Daejeon (KR)

(72) Inventors: Jae Hak Yu, Okcheon-gun (KR); Byung Bog Lee, Daejeon (KR); Hyo Chan Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 45 days.

(21) Appl. No.: 13/869,151

(22) Filed: Apr. 24, 2013

(65) Prior Publication Data

US 2013/0291108 A1    Oct. 31, 2013

(30) Foreign Application Priority Data

Apr. 26, 2012   (KR) ........................ 10-2012-0043733

(51) Int. Cl.
  *G06F 21/55*   (2013.01)
  *H04L 29/06*   (2006.01)

(52) U.S. Cl.
  CPC ............ *G06F 21/55* (2013.01); *H04L 63/1408* (2013.01); *H04L 63/1458* (2013.01)

(58) Field of Classification Search
  CPC ...... G06F 21/55; G06F 12/00; H04L 63/1416

USPC ............................................................. 726/23
  See application file for complete search history.

(56) References Cited

U.S. PATENT DOCUMENTS

| 7,568,228 | B2 * | 7/2009 | Dominique et al. | ............ 726/23 |
|---|---|---|---|---|
| 7,587,762 | B2 * | 9/2009 | Singhal et al. | ................... 726/23 |
| 7,603,709 | B2 * | 10/2009 | Lewis et al. | ...................... 726/23 |
| 7,712,133 | B2 * | 5/2010 | Raikar et al. | ...................... 726/23 |
| 8,161,188 | B2 * | 4/2012 | Gonda et al. | ................... 709/238 |
| 2005/0144480 | A1 * | 6/2005 | Kim et al. | ...................... 713/201 |

FOREIGN PATENT DOCUMENTS

| KR | 10-2009-0117542 A | 11/2009 |
|---|---|---|
| KR | 10-2010-0001786 A | 1/2010 |

OTHER PUBLICATIONS

Abuagla Babiker Mohammed, Near real time online flow-based internet traffic classification using machine learning (C4.5), Oct. 21, 2009.*

* cited by examiner

*Primary Examiner* — Teshome Hailu
*Assistant Examiner* — Thanh Le
(74) *Attorney, Agent, or Firm* — LRK Patent Law Firm

(57) ABSTRACT

Provided is an apparatus and method for detecting a traffic flooding attack and conducting an in-depth analysis using data mining that may rapidly detect a distributed denial of service (DDoS) attack, for example, a traffic flooding attack, developed more variously and firmly from a denial of service (DoS) attack, perform an attack type classification, and conduct a semantic analysis with respect to the attack. The apparatus and method may support a system operation and provide a more stable service, by rapidly detecting a traffic flooding attack, classifying a type of the attack, and conducting a semantic analysis based on a prediction and analysis scheme of data mining.

12 Claims, 2 Drawing Sheets

APPARATUS AND METHOD FOR DETECTING TRAFFIC FLOODING ATTACK AND CONDUCTING IN-DEPTH ANALYSIS USING DATA MINING

CROSS-REFERENCE TO RELATED APPLICATION

This application claims the benefit of Korean Patent Application No, 10-2012-0043733, filed on Apr. 26, 2012, in the Korean intellectual Property Office, the disclosure of which is incorporated herein by reference.

BACKGROUND

1. Field of the Invention

The present invention relates to an apparatus and method for detecting a traffic flooding attack and conducting an in-depth analysis using data mining that may rapidly detect a distributed denial of service (DDoS) attack, for example, a traffic flooding attack, developed more variously and firmly from a denial of service (DoS) attack, perform an attack type classification, and conduct a semantic analysis with respect to the attack.

2. Description of the Related Art

A traffic flooding attack represented by a denial of service (DoS)/distributed denial of service (DDoS) attack refers to an attack to make a normal service unavailable by depleting resources of a target network and computer system. Since such a traffic flooding attack may cause an incalculable amount of damage to a business, there is a demand for a security technology for rapidly detecting and handling a malicious access, an intrusion, and the like.

Conventional packet collecting methods for detecting a DoS/DDoS attack may enable a detailed analysis of an attack to be conducted. However, an expensive high-performance analysis system may be required and an extendibility in terms of installation and management may be insufficient.

In order to resolve such issues, a n intrusion detection methodology using management information base (MIB) information in a simple network management protocol (SNMP) is attracting attention. A traffic flooding attack detection using SNMP MIB information may be performed using a relatively small amount of system and network resources for collecting MIB information, and be provided with standardized network performance data. Accordingly, it is possible to support rapid and effective detection, when compared to a packet-based detection method.

A method of detecting a DDoS attack using SNMP MIB information may be classified into a protocol trend analysis, a diurnal traffic trend analysis, a method using a correlation between a specific attribute and attribute information in the MIB, and the like. However, most such methodologies have been used in a system developed depending on a function and property of an attack tool used for tests, and may have a disadvantage in that the entire algorithm is to be newly revised each time a new type of attack or tool is found.

According to recent research on study literatures, a number of interesting intrusion is detection systems using machine learning techniques and SNMP MIB information have been published, for example, a system for converting SNMP data into a probability density function and determining whether an intrusion occurs using a backpropagation-based artificial neural network, a system for detecting anomaly traffic in mobile adhoc networks by applying SNMP MIB information to a Bayesian classifier, a system for detecting an intrusion using an anomaly detection algorithm based on a principal component analysis, a system for detecting a traffic flooding attack and performing an attack classification using a support vector machine, and the like. However, such studies have the goal to solve the disadvantages of a traditional DDoS detection methodology so that they may overlook the advantages of a traditional methodology. In other words, the above mentioned machine learning methodology has been holding its ground only in the construction of an efficient system. It overlooked the mechanical interpretation on the system mechanism and it turned the core execution mechanism into a black-box. Therefore, more comprehensive system, even though it is rather heuristic, that can consider the hermeneutic advantages of traditional DDoS detection methodology is deemed to be desirable.

Accordingly, herein, although it is a heuristic methodology, a more comprehensive system considering hermeneutic advantages of the conventional DDoS detecting methodology may be suggested. A system for detecting a traffic flooding attack and performing an attack classification using SNMP MIB information, based on a C4.5 algorithm, in a decision tree corresponding to a representative prediction and classification model of data mining, may be designed and implemented. In addition, a semantic in-depth analysis for extracting and analyzing features included in the SNMP MIB information regarding the traffic flooding attack and the attack type in a form of a rule using association rule mining corresponding to a representative hermeneutic analysis model of the data mining may be conducted after a feature selection and reduction is performed using attribute subset selection with respect to the SNMP MIB information as data pre-processing. Automatic rule extraction and semantic in-depth interpretation of specific rules out of traffic flooding attacks and their data by attack is also expected to provide a positive possibility and to give a momentum for the development of new methodologies for the intrusion detection systems as well as a theoretical ground for intrusion detection and response system.

SUMMARY

An aspect of the present invention provides an apparatus and method for detecting a traffic flooding attack and conducting an in-depth analysis using data mining that may support a more stable network environment and smooth resource management, by providing a scientific policy basis based on a semantic in-depth analysis of decision tree model (C4.5)-based rapid detection and attack classification with respect to a distributed denial of service (DDoS) attack, and association rule mining-based attack detection and classification.

According to an aspect of the present invention, there is provided an apparatus for detecting a traffic flooding attack and conducting an in-depth analysis using data mining, the apparatus including a generation module to generate a management information base (MIB) based on network traffic data, a sensing module to determine, by collecting the MIB, a point in time at which a detection system is operated, a storage module to store an MIB determined by the detection system analyzing the MIB, and an attack determining module to determine whether an attack is detected and a type of the attack, based on the determined MIB.

According to another aspect of the present invention, there is also provided a method of detecting a traffic flooding attack detection and conducting an in-depth analysis using data mining, the method including generating an MIB based on network traffic data, determining, by collecting the MIB, a point in time at which a detection system is operated, storing an MIR determined by the detection system analyzing the MIB, and determining whether an attack is detected and a type of the attack, based on the determined MIB.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
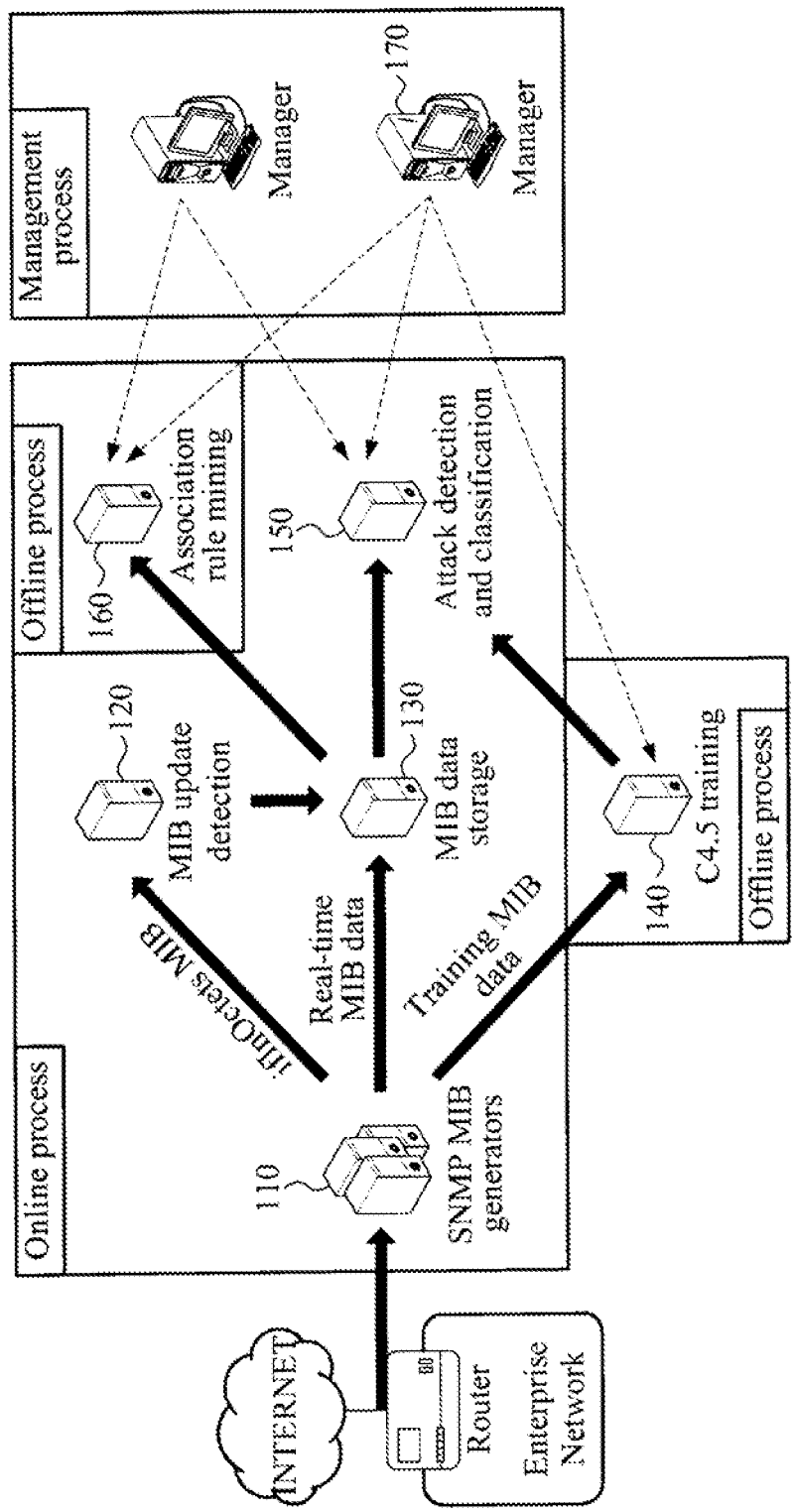
FIG. 1 is a diagram illustrating an apparatus for detecting a traffic flooding attack and conducting an in-depth analysis using data mining according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an apparatus and method for detecting a traffic flooding attack and conducting an in-depth analysis using data mining will be described with reference to the accompanying drawings.

FIG. 1 is a system diagram illustrating an apparatus for detecting a traffic flooding attack and conducting an in-depth analysis using data mining according to an embodiment of the present invention. The system may include a total of three modules for traffic flooding attack detection and analysis of a hierarchical structure. An online processing module may include a generation module 110, for example, a simple network management protocol (SNMP) management information base (MIB) generator's module configured to generate MIB information from the network traffic data, a sensing module 120, for example, an MIB update detection module configured to collect ifInOctets MIB, determine the activation time of a detection system, and execute MIB data store, a storage module 130, for example, an MW data storage module configured to store only the MW information that is determined in the C4.5 training module from the target system, and an attack determining module 150, for example, an attack detection and classification module. Here, the collected information may be transferred to the attack detection and classification module and then, it may be used to judge the occurrence of attacks and the attack type in real-time. An offline processing module may include a detection system 140, for example, a C4.5 training module configured to randomly generate various traffic attacks to execute a C4.5-based learning, and an association rule module 160, for example, an association rule mining module configured to conduct an in-depth semantic interpretation that extracts and analyzes the data characteristics of the data stored in the MIB data storage module in a form of rule. Here, a manager module 170 may detect traffic flooding attack in real-time, and monitor detailed information about classification type.

The generation module 110 may generate MIB information corresponding to an SNMP, based on network traffic data over the Internet.

The sensing module 120 may collect ifInOctets MIB information of the SNMP from the generation module 110, determine a point in time at which the detection system 140 is to be operated, and execute the storage module 130.

The storage module 130 may select MIB information determined by the detection system 140, for example, the C4.5 training system, among the collected MIB information, from a target system, and store the selected MIB information.

The collected MIB information may be transferred to the attack determining module 150, and the attack determining module 150 may determine whether an attack is detected and a type of the attack in real time, based on the MIB information.

The detection system 140 may generate various arbitrary traffic attacks, and perform a decision tree C4.5 based learning.

The association rule module 160 may conduct a semantic in-depth analysis for extracting and analyzing features of the MIB information stored in the storage module 130 in a form of a rule.

The manager module 170 may monitor detailed information regarding real-time detection and classification of a traffic flooding attack through the attack determining module. 150, and to utilize semantic analysis information and rules provided by the association rule module 160 and the C4.5 learning of the detection system 140 for policy establishment of an intrusion detection and response system, and the like.

Figure 2:
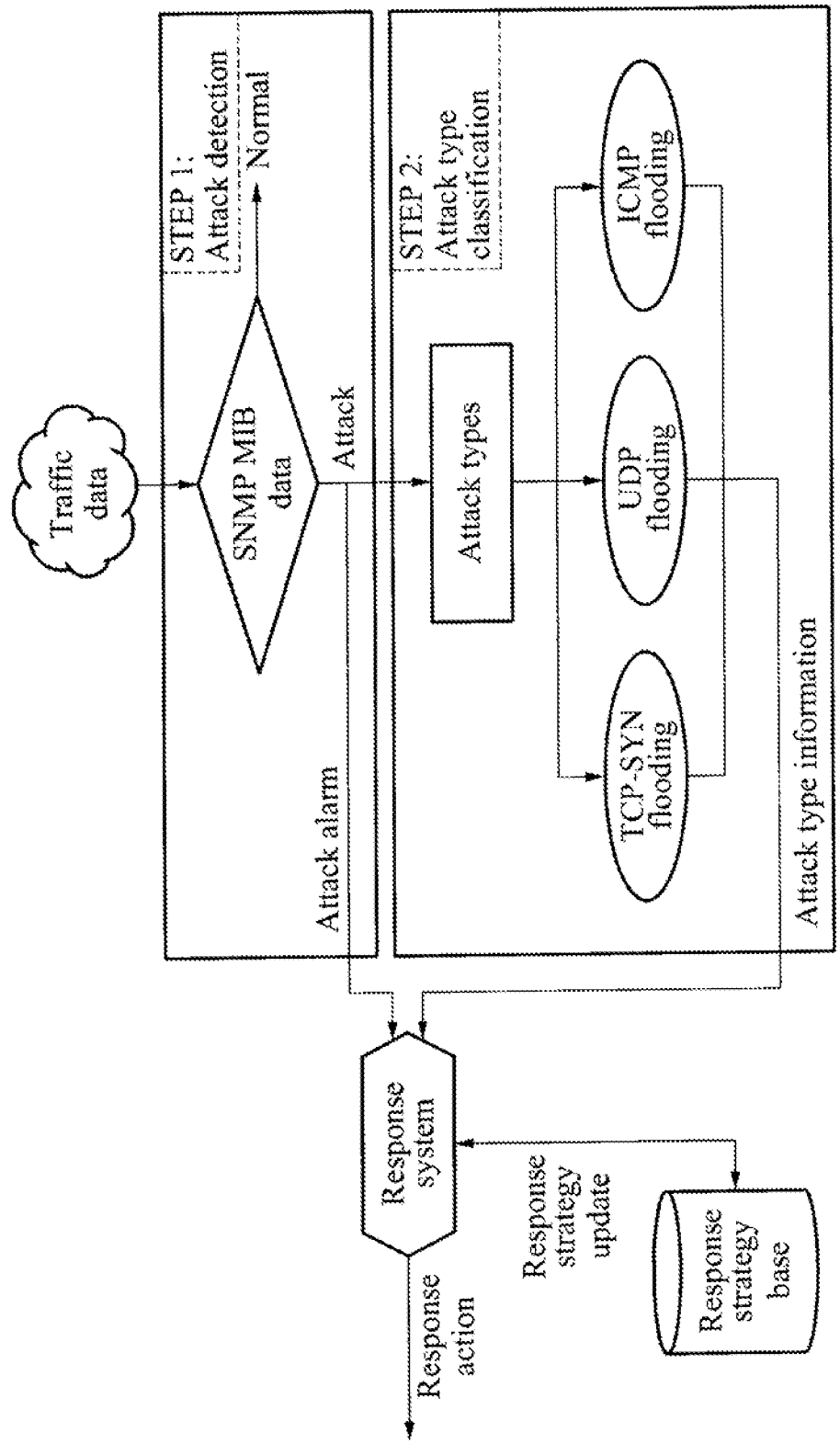
FIG. 2 is a diagram illustrating a method of detecting a traffic flooding attack and classifying attack types based on C4.5 of a decision tree according to an embodiment of the present invention.

FIG. 2 is a diagram illustrating a method of detecting a traffic flooding attack and classifying attack types based on C4.5 of a decision tree according to an embodiment of the present invention.

The attack determining module 150 may include two layers. A first layer may correspond to a layer configured to classify traffic into normal traffic and anomaly traffic. The first layer may report, in real time, an intrusion to a system manager of an intrusion response system through the manager module 170 when attack traffic is detected. A second layer may classify all the attack traffic that is judged as a traffic flooding attack into a transmission control protocol-synchronize sequence numbers (TCP-SYN) flooding attack, a user datagram protocol (UDP) flooding attack, and an Internet control message protocol (ICMP) flooding attack, respectively, and provide additional information about the attack type to the intrusion response system, for example, the detection system 140. The attack to determining module 150 may classify the traffic flooding attack for each type, thereby restricting and managing services only for an attacked protocol. Accordingly, it is possible to support a more stable network environment and smooth resource management.

A decision tree is a methodology that has been frequently used in the classification and prediction in data mining. Its impact and interaction between variables can be easily understood. In contrast to a neural network structure analysis, the decision tree expresses obtained knowledge intuitively and generates rules readily and thus, may be used for a main purpose of proposing a classification and prediction model. Most of the decision-making algorithms adopt a greedy approach in which the decision trees are constructed in a top-down recursive divide-and-conquer manner. Since an Iterative dichotomiser 3 (ID3), a representative algorithm of the decision tree, has a disadvantage in that an attribute having a value within a wide range is selected as an upper node, the C4.5 decision tree algorithm which is most advanced and of which classification and prediction performance is already qualified may be used herein. In C4.5, each node in a tree is associated with a set of cases. Also, cases are assigned weights to take into account unknown attribute values.

An entropy and information quantity of each attribute may be obtained, as given by the following Equation 1. The information gain of an attribute a for a set of cases Y may be calculated as follow: If a is discrete, and $Y_1, \ldots, Y_s$ are the subsets of Y consisting of cases with distinct known value for attribute a, then:

$$\text{gain} = info(Y) - \sum_{i=1}^{n} \frac{|Y_i|}{|Y|} \times info(Y_i), \quad [\text{Equation 1}]$$

where $$info(Y) = -\sum_{j=1}^{NClass} \frac{freq(C_j, Y)}{|Y|} \times \log_2\left(\frac{freq(C_j, Y)}{|Y|}\right)$$

Equation 1 is the entropy function. While having an option to select information gain, by default, however, C4.5 considers the information gain ratio of the splitting $Y_1, \ldots, Y_s$, which is the ratio of information gain to its split information. Accordingly, an information gain may be defined, as given by Equation 2.

$$\text{Split } info(Y) = -\sum_{i=1}^{n} \frac{|Y_i|}{|Y|} \times \log_2\left(P\frac{|Y_i|}{|Y|}\right) \quad [\text{Equation 2}]$$

It is easy to see that if a discrete attribute has been selected at an ancestor node, then its gain and gain ratio are zero. Thus, C4.5 does not even compute the information gain of those attributes. In Equation 2, the potential information is generated by dividing Y into n subsets, whereas the information gain measures the information relevant to classification that arises from the same division. Then, $$\text{Gain ratio}(Y) = \frac{gain(Y)}{\text{Split } info(Y)} \quad [\text{Equation 3}]$$

expresses the proportion of information generated by the split that is useful, i.e., that appears helpful for classification.

Herein, as a data pre-processing process, feature selection and reduction may be performed using an attribute subset selection with respect to SNMP MIB information. In addition, a semantic in-depth analysis for extracting and analyzing features included in SNMP MIB information for each traffic flooding attack and attack type in a form of a rule may be conducted using association rule mining corresponding to a representative hermeneutic analysis model of data mining. Among attribute subset selection schemes with respect to the SNMP MIB information, a performance-qualified scheme of Hall [M. Hall, "Correlation-based Feature Selection for Machine Learning", PhD Diss. Department of Computer Science, 1998] may be used. The scheme of Hall may correspond to a method of searching for a minimum number of attribute sets that may express a most similar probability distribution of all attributes, by calculating a conditional probability using a best first search scheme, an entropy for an attribute or feature value, a Pearson's correlation coefficient between a target class and attributes. In order to obtain an information gain for each attribute, an entropy with respect to a predetermined attribute and a relationship between attributes X and Y may be calculated as a conditional probability at which the attribute Y occurs when the attribute X is given, as given by Equation 4.

$$H(Y) = -\sum_{y \in Y} p(y) \log_2(p(y)) \quad [\text{Equation 4}]$$

If the observed values of Y in the training data are partitioned according to the values of a second feature X, and the entropy Y with respect to the partitions induced by X is less than the entropy of Y prior to partitioning, then there is a relationship between features Y and X. Equation 5 gives the entropy of Y after observing X.

$$H(Y|X) = -\sum_{x \in X} p(x) \sum_{y \in Y} p(y|x) \log_2(p(y|x)) \quad [\text{Equation 5}]$$

An information gain for each feature may be defined using Equations 4 and 5, as given by Equation 6.

$$\text{Gain} = H(Y) + H(X) - H(X, Y) \quad [\text{Equation 6}]$$

A correlation and a distribution of the predetermined two attributes X and Y may be calculated using a symmetrical uncertainty based on the information gain obtained using Equation 6, as given by Equation 7. In this instance, when the attribute V shows a high distribution and correlation based on the attribute X, the attribute X may be included in a subset that may express all attributes efficiently, whereas the attribute Y may not be included. Similarly, a subset may be configured by calculating a distribution and correlation between a target class and attributes.

$$\text{Symmetrical uncertainty coefficient} = 20 \times \left[\frac{\text{Gain}}{H_i Y_i + H(X)}\right] \quad [\text{Equation 7}]$$

In order to evaluate an efficiency of each subset $F_s \subset F$ in expressing all attributes, a merit function of Equation 8 may be used. It may be determined that a subset having a greatest value of the merit function is a subset expressing the all attributes optimally.

$$\text{Merit}(F_S) = \frac{k\overline{r_{cf}}}{\sqrt{k - k(k-1)\overline{r_{ff}}}} \quad [\text{Equation 8}]$$

In Equation 8, $F_s$ is the merit function of a feature subset S containing k features, $\overline{r_{cf}}$ is the mean feature-class correlation, and $\overline{r_{ff}}$ is the average feature-feature inter-correlation.

The association rule mining may refer to a methodology for searching for a meaningful association between objects existing in data, and an association rule may be expressed in a form of a conditional proposition, for example, A&B⇒C. When a whole data set D is provided, the association rule mining may be performed such that all data having a repeated property or rarely used in the whole data set D may be included and thus, a number of meaningless rules may be generated. Accordingly, before the association rule mining is performed, an attribute subset d in which features of a property repeated or not in use are removed may be found using the attribute subset selection of the attribute subset mentioned above. The association rule mining may be performed to attempt to extract rules included in the data and conducting an in-depth analysis. Let $I=\{I_1, I_2, I_3, \ldots, I_m\}$ be a set of items. Let D, the task-relevant data, be a set of database transactions where each transaction T is a set of items such that $T \subseteq I$. Each transaction is associated with and identifier, called TID. LET A be a set of items. A transaction T is said to contain A if and only if $A \subseteq T$. Here, when $A \subset I$, $B \subset I$, $A \cap B = C$ is satisfied, an association rule may be expressed in a form of $R: A \Rightarrow B$, A may indicate an antecedent of the rule, and B may indicate a consequent of the rule. The extracted associated rule may be evaluated based on a support and a confidence. The rule $A \Rightarrow B$ may have a support S when a percentage of a transaction including both a set A and a set B in a transaction set D corresponds to S. This may be obtained by calculating a probability $P(A \cup B)$. When, among transactions including the set A, a percentage of a transaction including the set B as well corresponds to C, the rule $A \Rightarrow B$ may have a confidence C. A confidence may be obtained by calculating a conditional probability $P(B|A)$. The foregoing may be expressed, as given by Equation 9.

$$\text{support}(A \Rightarrow B) = P(A \cup B)$$

$$\text{confidence}(A \Rightarrow B) = P(B|A) \quad [\text{Equation 9}]$$

Rules that satisfy both a minimum support threshold and a minimum confidence threshold are called strong. In this instance, an itemset having a support value greater than or equal to the minimum support threshold may be referred to a frequent itemset. A frequent itemset including a K number of items may be referred to as a K-frequent itemset. In an Apriori algorithm useful for searching for a frequent itemset for a binary association rule, a $K^{th}$ itemset may employ a repetitive approach used for searching for a $(K+1)^{th}$ itemset, and such an approach may be known as a level-wise method. A frequent 1-itemset may be denoted as $L_1$, $L_1$ may be used for searching for a 2-itemset $L_2$, and $L_2$ may be used for searching for a 3-itemset $L_3$. The foregoing method may be performed until a frequent K-itemset is absent.

According to exemplary embodiments of the present invention, it is possible to support a system operation and provide a more stable service, by rapidly detecting a traffic flooding attack, classifying a type of the attack, and conducting a semantic analysis based on a prediction and analysis scheme of data mining.

According to exemplary embodiments of the present invention, a new scheme of detecting a traffic flooding attack and performing attack type classification using SNMP MIB information, based on a C4.5 algorithm of a decision tree corresponding to a representative prediction and classification model of data mining.

According to exemplary embodiments of the present invention, it is possible to provide a method of extracting and analyzing rules with respect to an operating principle additionally provided by C4.5, generating rules in a form of IF-THEN, and conducting a semantic analysis.

According to exemplary embodiments of the present invention, it is possible to support a more stable network environment and smooth resource management by detecting useful knowledge included in data for each attack pattern and type and conducting an in-depth analysis, using an association rule scheme.

According to exemplary embodiments of the present invention, it is possible to propose a new momentum for an intrusion detection and response system, by detecting a traffic flooding attack, classifying a type of the attack, extracting rules included in attack information automatically, and conducting a semantic analysis.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for detecting a traffic flooding attack and conducting an in-depth analysis using data mining, the apparatus comprising:
   a generator that generates a management information base (MIB) based on network traffic data;
   a sensor that determines, by collecting the MIB, a point in time at which a detection system is operated;
   a storage that stores an MIB determined by the detection system analyzing the MIB;
   an attack determiner that determines whether an attack is detected and a type of the attack, based on the determined MIB; and
   an offline processor configured to both randomly generate various traffic attacks to execute a C4.5-based learning, and to conduct an in-depth semantic interpretation that extracts and analyzes data characteristics of data stored in the storage in a form of rule, the rule associated with the C4.5-based learning and the in-depth semantic interpretation comprising a selection and reduction processes using "IF-THEN" algorithm corresponding to types of traffic flooding attacks,
   the selection and reduction being performed using association rule mining by calculating conditional probability of entropy between a target class and attributes comprising X and Y,
   the calculation being performed based on determination whether or not the attribute Y being highly or repeatedly distributed, correlated, or occurred when the attribute X is given, wherein
   a number of meaningless rules are generated according to the determination if attribute Y being rarely distributed, correlated, or occurred when the attribute X is given, and wherein
   the offline processor is connected to one network and receives the monitoring network traffic data from the one network.

2. The apparatus of claim 1, wherein the detection system generates various arbitrary traffic attacks and performs a decision tree based learning.

3. The apparatus of claim 1, further comprising:
   an association rule apparatus that conducts a semantic in-depth analysis for extracting and analyzing features of data stored in the storage in a form of a rule.

4. The apparatus of claim 3, further comprising:
   a managing apparatus that monitors detailed information regarding real-time attack detection and classification performed by the attack determiner, and to utilize semantic analysis information and rules provided by the association rule apparatus and the detection system for policy establishment of an intrusion detection and response system.

5. The apparatus of claim 1, wherein the attack determiner reports an intrusion to the managing apparatus in real time when attack traffic is detected.

6. The apparatus of claim 1, wherein the attack determiner classifies attack traffic into a transmission control protocol-synchronize sequence numbers (TCP-SYN) flooding attack, a user datagram protocol (UDP) flooding attack, and an Internet control message protocol (ICMP) flooding attack, and provides additional information on a type of a corresponding attack.

7. A method of detecting a traffic flooding attack detection and conducting an in-depth analysis using data mining, the method comprising:

supplying generating a management information base (MIB) based on network traffic data;

determining, by collecting the MIB, a point in time at which a detection system is operated;

storing an MIB determined by the detection system analyzing the MIB;

determining whether an attack is detected and a type of the attack, based on the determined MIB;

both randomly generating various traffic attacks to execute a C4.5-based learning, and conducting an in-depth semantic interpretation that extracts and analyzes data characteristics of data stored in the storage in a form of rule, the rule associated with the C4.5-based learning comprising a selection and reduction processes using "IF-THEN" algorithm corresponding to types of traffic flooding attacks, the selection and reduction being performed using association rule mining by calculating conditional probability of entropy between a target class and attributes comprising X and Y, and the calculation being performed based on determination whether or not the attribute Y being highly or repeatedly distributed, correlated, or occurred when the attribute X is given; and generating a number of meaningless rules according to the determination if attribute Y being rarely distributed, correlated, or occurred when the attribute X is given.

8. The method of claim 7, further comprising:
generating various arbitrary traffic attacks and performing a decision tree based learning.

9. The method of claim 7, further comprising:
conducting a semantic in-depth analysis for extracting and analyzing features of the stored MIB in a form of a rule.

10. The method of claim 9, further comprising:
monitoring detailed information regarding real-time attack detection and classification with respect to the determining of whether an attack is detected and a type of the attack, and utilizing semantic analysis information and rules provided by the conducting of the semantic in-depth analysis and the detection system for policy establishment of an intrusion detection and response system.

11. The method of claim 7, the determining of whether an attack is detected and a type of the attack comprises reporting an intrusion in real time when attack traffic is detected.

12. The method of claim 7, wherein the determining of whether an attack is detected and a type of the attack comprises classifying attack traffic into a transmission control protocol-synchronize sequence numbers (TCP-SYN) flooding attack, a user datagram protocol (UDP) flooding attack, and an Internet control message protocol (ICMP) flooding attack, and providing additional information on a type of a corresponding attack.

* * * * *